8 Sheets--Sheet 1.

M. L. GORHAM.
Grain-Binder.

No. 159,506.

Patented Feb. 9, 1875.

M. L. GORHAM.
Grain-Binder.

No. 159,506.

8 Sheets--Sheet 2.

Patented Feb. 9, 1875.

M. L. GORHAM.
Grain-Binder.

No. 159,506.

8 Sheets--Sheet 4.

Patented Feb. 9, 1875.

M. L. GORHAM.
Grain-Binder.

No. 159,506.

8 Sheets--Sheet 5.

Patented Feb. 9, 1875.

M. L. GORHAM.
Grain-Binder.

No. 159,506.

8 Sheets--Sheet 6.

Patented Feb. 9, 1875.

M. L. GORHAM.
Grain-Binder.
No. 159,506.
8 Sheets--Sheet 7.
Patented Feb. 9, 1875.
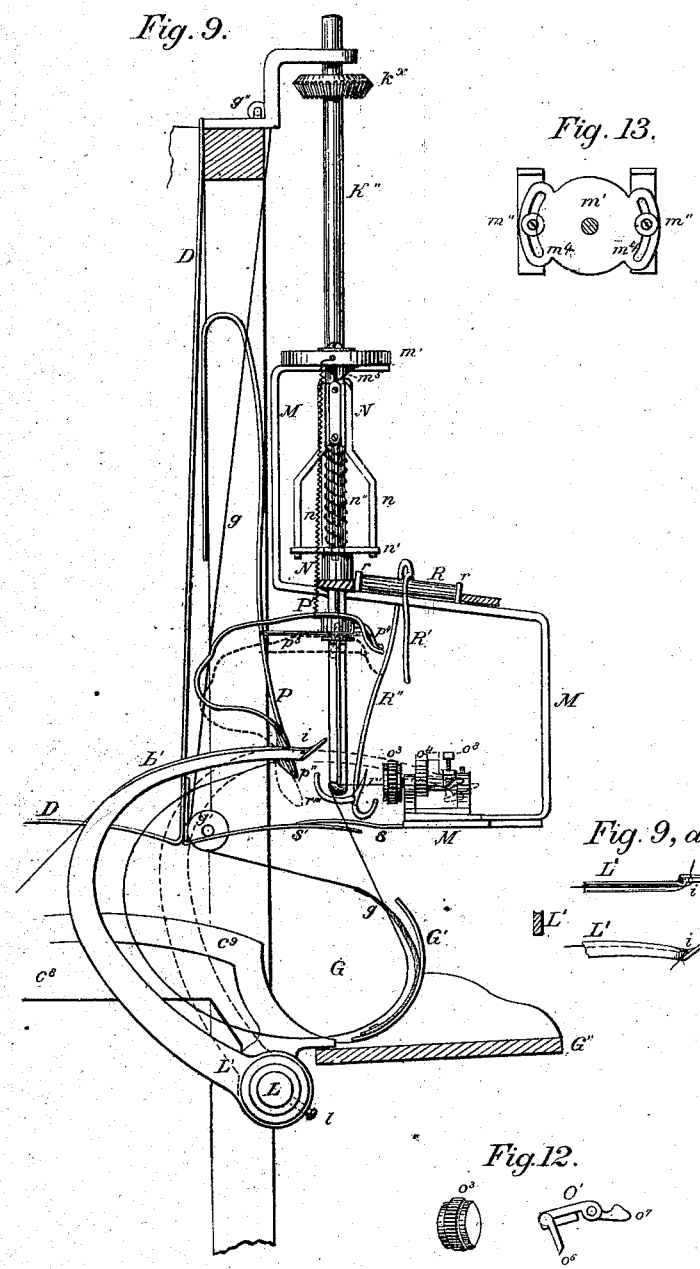
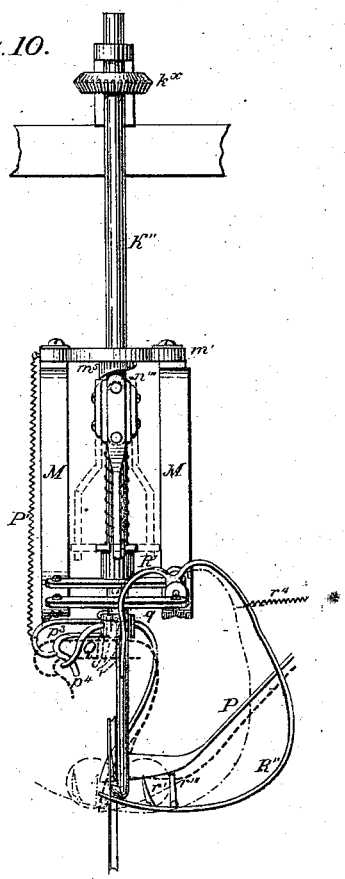
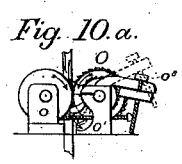
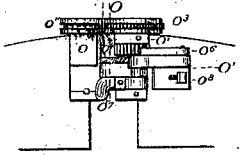

M. L. GORHAM.
Grain-Binder.
No. 159,506.
Patented Feb. 9, 1875.
8 Sheets--Sheet 8.
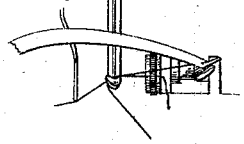
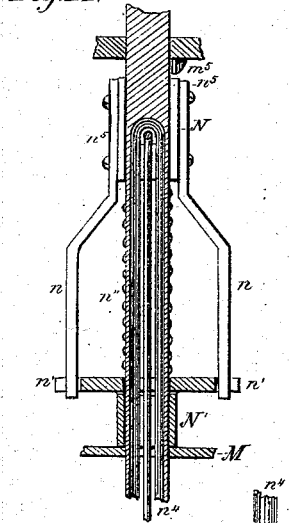
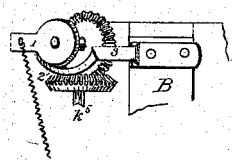
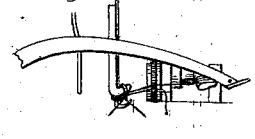
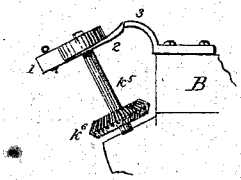
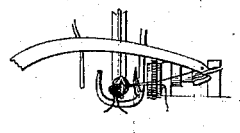
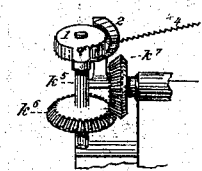
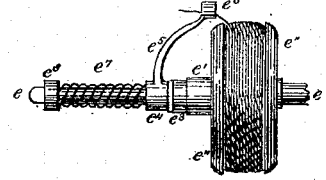
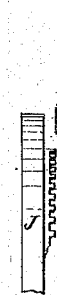
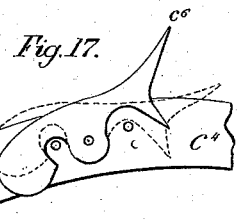
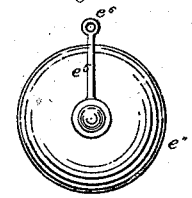
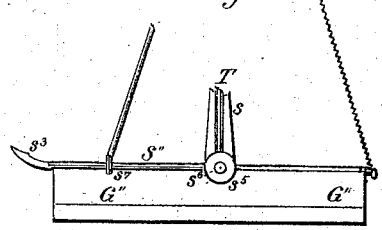

UNITED STATES PATENT OFFICE.

MARQUIS L. GORHAM, OF ROCKFORD, ILLINOIS.

IMPROVEMENT IN GRAIN-BINDERS.

Specification forming part of Letters Patent No. 159,506, dated February 9, 1875; application filed September 12, 1874.

*To all whom it may concern:*

Be it known that I, MARQUIS L. GORHAM, of Rockford, in the county of Winnebago, in the State of Illinois, have invented certain Improvements in Machines for Binding Grain, of which the following is a specification:

The object of this invention is to produce a machine for binding grain that will automatically receive the cut grain from the harvester, determine the size of the gavels or bundles, perfectly and securely tie the bundles, and when so tied discharge them from the machine without any interference or agency other than the machinery that operates it; and it consists in the construction and arrangement of the parts and devices, as will be hereinafter fully described.

Figure 1:
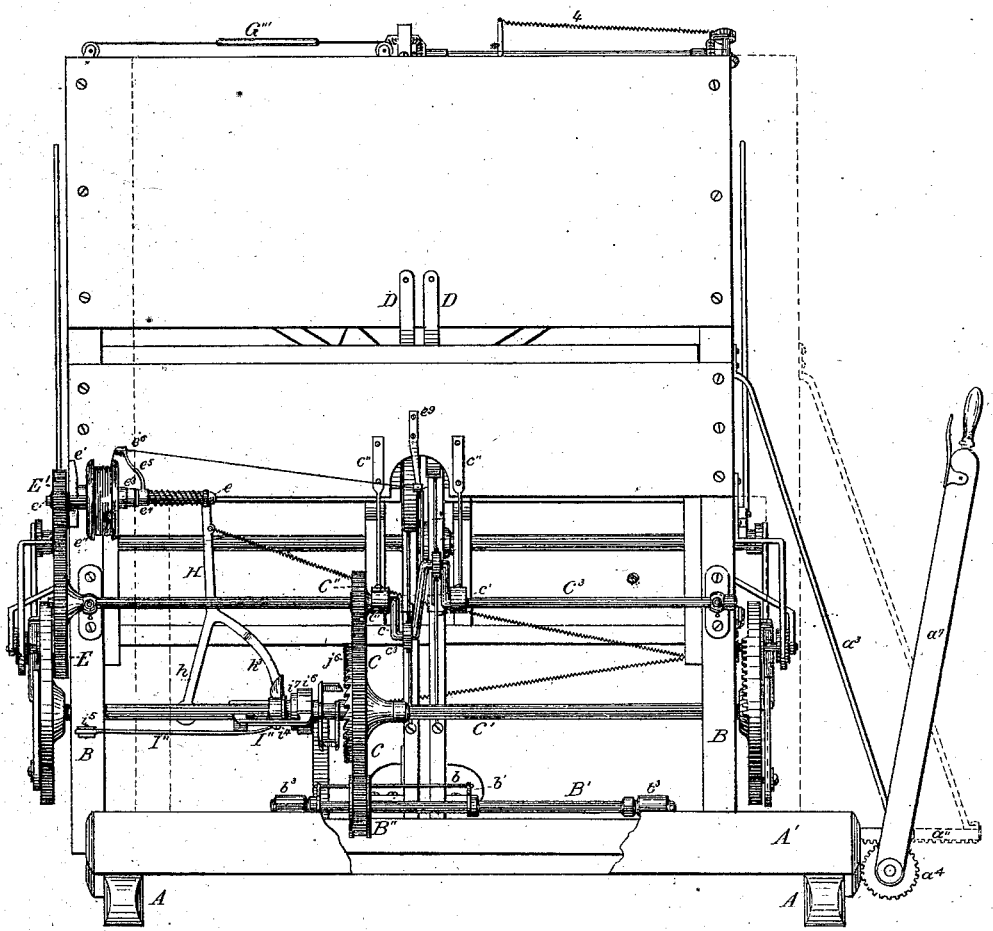
Figure 2:
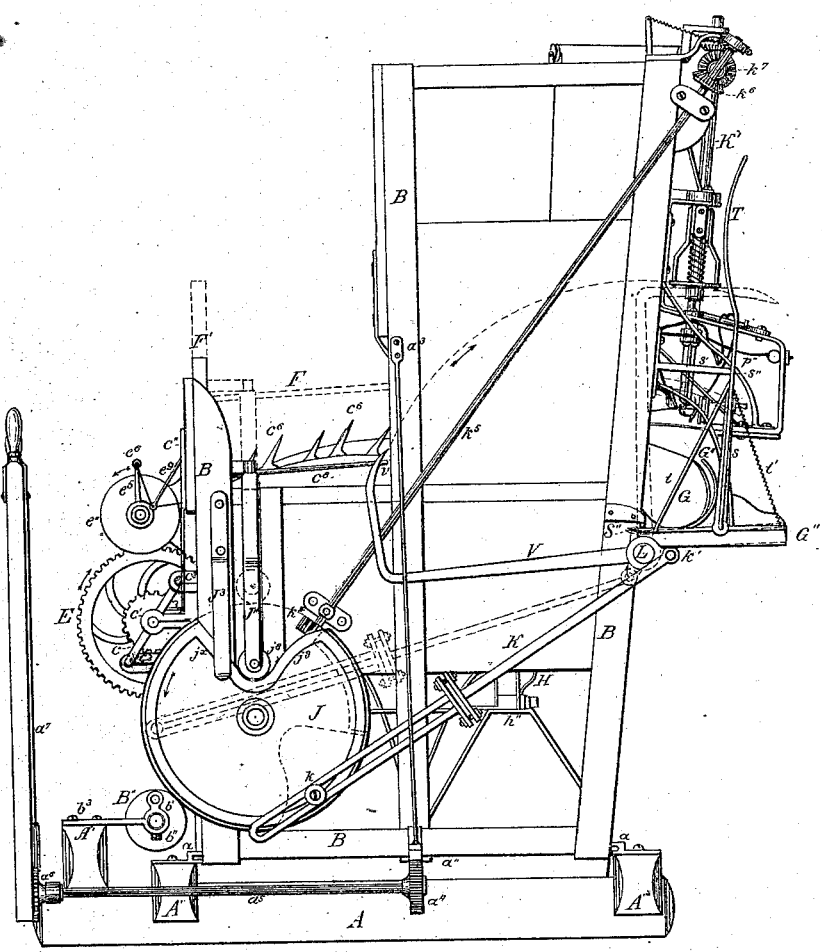
Figure 3:
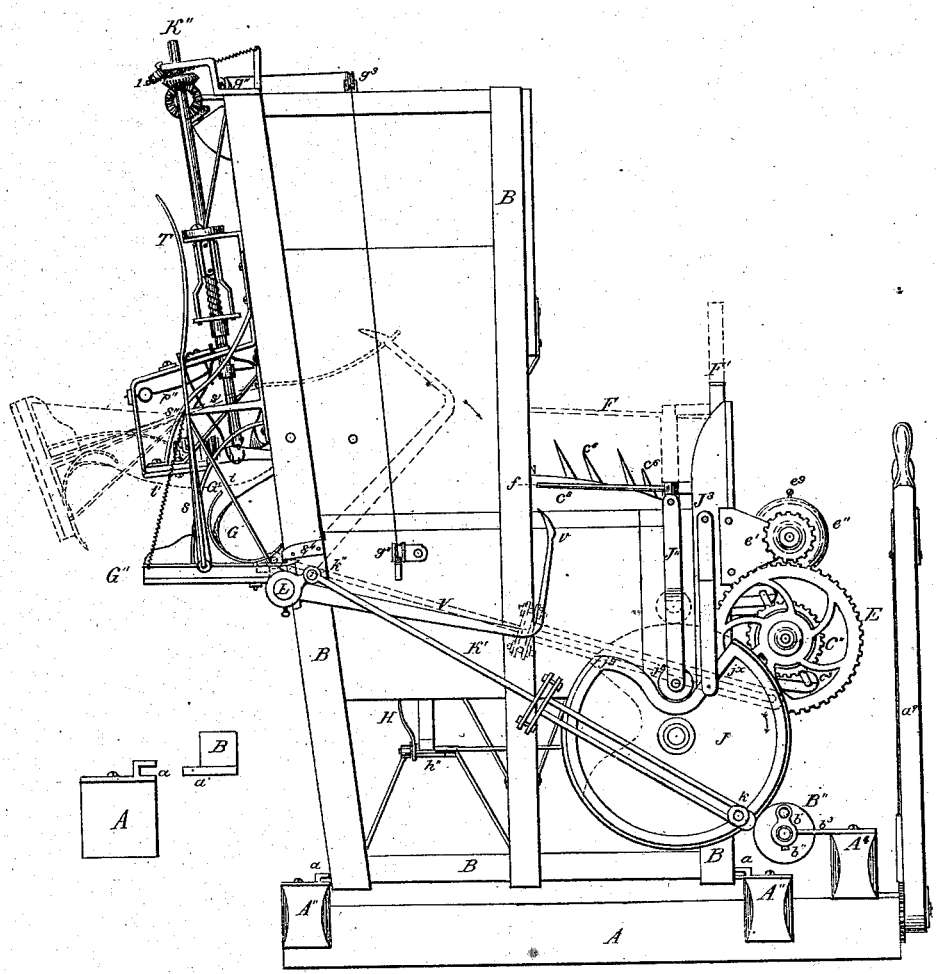
Figure 4:
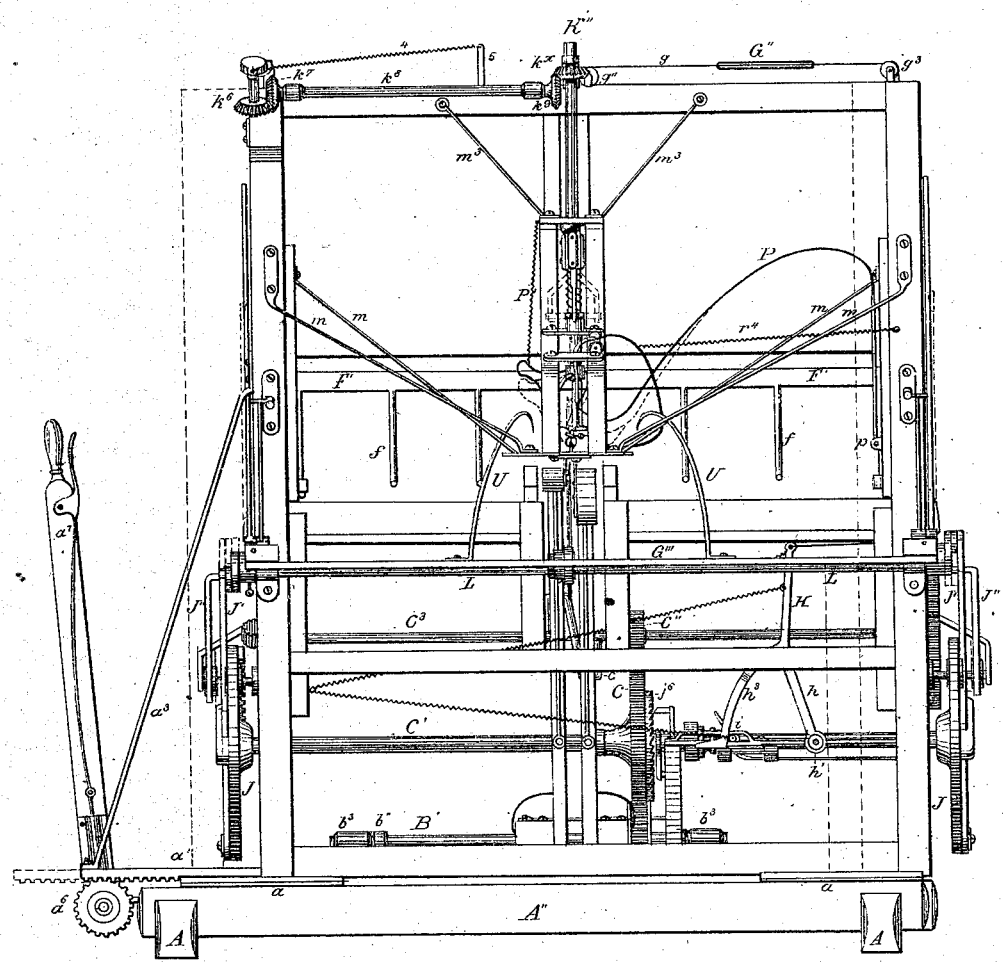
Figure 5:
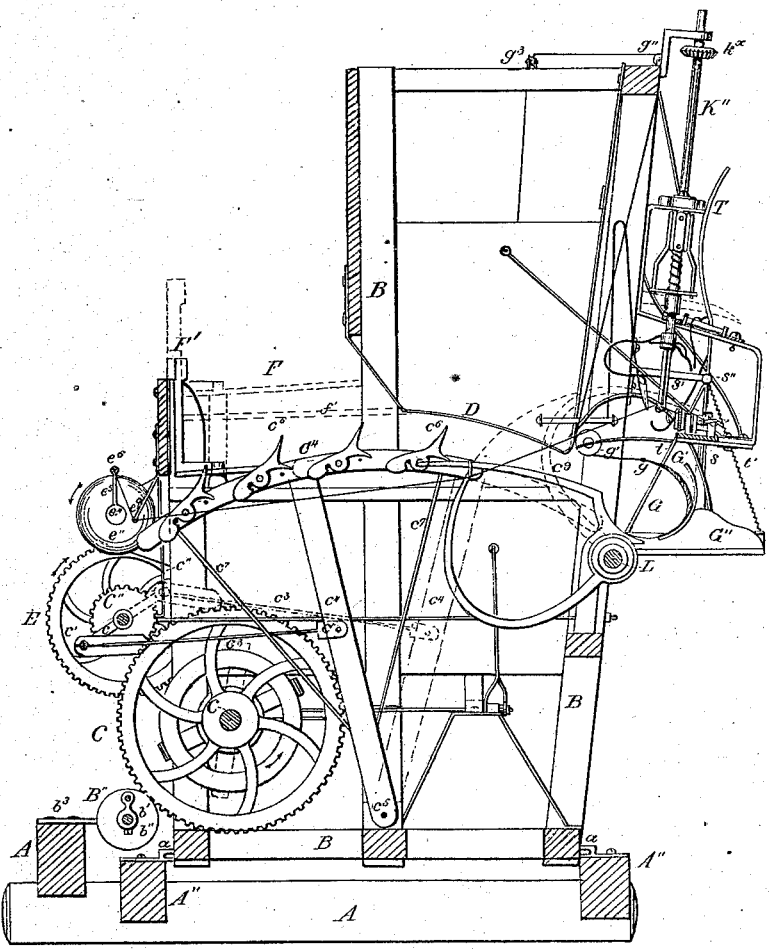
Figure 6:
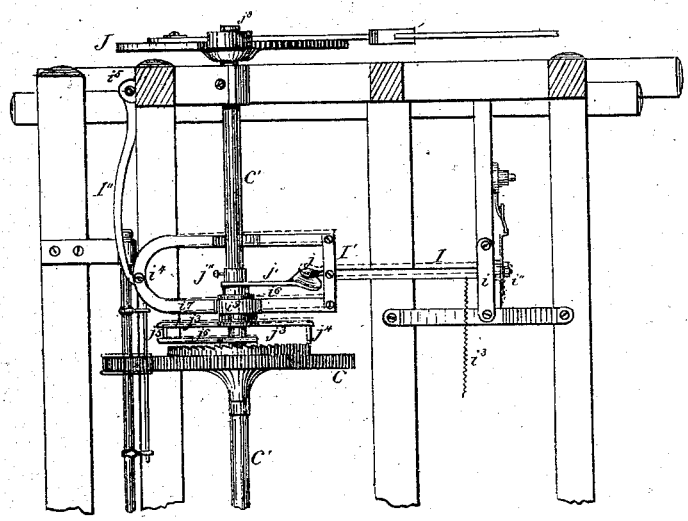
Figure 7:
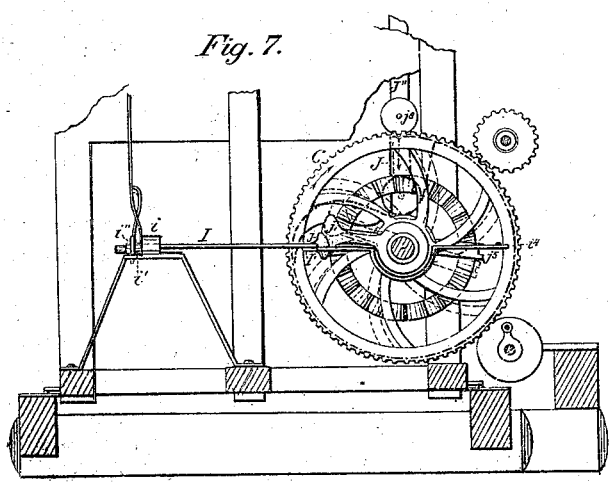
Figure 8:
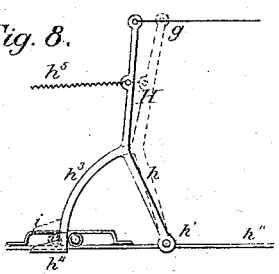

In the drawings, Figure 1 represents a front vertical view of the machine; Fig. 2, an upright view of the left-hand side; Fig. 3, an upright view of opposite side; Fig. 4, an upright view of the rear or delivery end; Fig. 5, a vertical sectional view from front to rear; Fig. 6, a plan view of details; Fig. 7, a side view of same; Figs. 8, 9, $9^a$, 10, $10^a$, 11, 12, 13, 14, $14^a$, $14^b$, $14^c$, $15^a$, $15^b$, $15^c$, $16^a$, $16^b$, $16^c$, $16^d$, 17, $18^a$, $18^b$, and 19, enlarged details.

A represents the main longitudinal sills of a harvester extended to support the binder. A' is a cross-tie, to hold the sills in position, and also to be a support to some of the actuating parts of the machine. A'' A'' are cross-ties, upon which the binder-frame is supported. B B represent the movable frame, that contains and supports the binder and its actuating parts. B' is the driving-shaft of the binder, and is put in revolution by any suitable intermediate mechanism from the power that operates the harvester. B'' is a spur-gear wheel, loosely fitted upon driving-shaft B', so as to slide longitudinally thereon when necessary, and has a hole parallel with the eye, that goes over the shaft and near the base of the teeth to receive a rod, $b$, which passes through the wheel and is held fast at each end by movable heads or dogs $b'$, that have eyes that receive the shaft B', and are made fast thereto by holding-screws $b''$, so that when the dogs are fast on the shaft the wheel B'' will revolve with the shaft, and be left to freely slide upon the shaft the length of the rod between the driving-dogs $b'$. Shaft B' is supported and held in bearings $b^3$ $b^3$ on cross-tie A'. C is a spur-gear wheel on shaft C', that revolves in proper bearings in frame B, and gears into driving-wheel B'', and from which it gets motion and becomes the driver to gear-wheel C'' on crank-shaft $C^3$, that is revolved in proper bearings on front of frame B. Crank-shaft $C^3$ has two cranks, $c$ $c$, projecting in opposite directions from the axis of the shaft, and is supported centrally upon each side of the cranks in bearings $c'$ $c'$, by suspending-rods $c''$ $c''$, that are fast at their upper ends to the frame B. $c^3$ $c^3$ are pitmen or connecting-rods working on cranks $c$ of shaft $C^3$, and are pivoted at $c^x$ to vibrating arms $c^4$ $c^4$, that are pivoted at $c^5$ to a cross-sill of frame B, so that, as the shaft $C^3$ revolves, the cranks, through the pitmen, give to arms $c^4$ a horizontal vibrating movement at their upper ends. $C^4$ $C^4$ are segments, attached to the upper ends of arms $c^4$, the peripheries of which are concentric with the pivotal center $c^5$ of vibrating arms $c^4$, and on these segments are a number of pivoted feed-dogs or teeth, $c^6$. These feed-dogs are pivoted to the segments that, when in repose, or when the segment is vibrated in one direction, they will, by the way they are balanced, drop down, so that the points will only project a small distance above the segments, but when the segments are vibrated in the opposite direction, or in contact with any substance, they will rise, as seen in Fig. 5. The cranks projecting from opposite sides of the revolving shaft to which the pitmen connect with the arms $c^4$, will give to the segments alternately a forward and back movement, or when one segment vibrates in one direction the other is moving in the opposite direction. $c^7$ $c^7$ are braces, that go from the outer ends of the segments to near the bottom of arm $c^4$, to strengthen the outer ends of the segments. $c^8$ $c^8$ are curved guides, one on either side of the toothed segments, to hold the passing straw up from contact with the floor of the receiver, and insure a passage of all the straw by the teeth on the segments. $c^9$ is a guide to conduct and insure the direction of the unbound grain into the binding-receptacle, and is placed to be in the center or balance of the bundle, and is in a line between the toothed feeding-segments $C^4$, and of such shape at its rear end as to form a part of the binding-receptacle. D D are guides, placed at a proper distance over the guides $c^8$, are curved on their under surfaces, and are concentric to the center of vibration or pivotal point of arms $c^4$, and parallel or nearly parallel to the curved faces of guides $c^8$, and are supported at their forward and upper ends to frame B, and at their rear ends by being bent nearly perpendicular, and extending upward to where they are attached to the rear and upper part of frame B. E is a gear-wheel on the edge of crank-shaft $C^3$, and revolves with shaft $C^3$, and gears into and gives motion to gear-wheel E' on a short shaft, $e$, in bearings $e'$ projecting from and fast to frame B. Fast to the bearing of the short shaft $e$ is the non-revolving reel or cord spool $e''$, held on the bearing by a feather or other device to prevent revolution, to secure it in position and yet allow the spool to be quickly and easly removed from the shaft $e$. $e^3$ is a collar, fast on shaft $e$, and revolves with it. $e^4$ is an eye loosely fitted on shaft $e$, and can revolve thereon, and has bent arm $e^5$ projecting from it, and at its outer end has an eye, $e^6$, through which the cord passes in going from the spool to the binding device. $e^7$ is a spiral spring around shaft $e$, between eye $e^4$ and washer $e^8$. The washer $e^8$ freely slides upon the shaft $e$, and can be adjusted to different distances from eye $e^4$, to give different degrees of friction to the revolving eye $e^4$, and regulate the tension of the cord.

This construction and arrangement of the fixed spool upon its shaft, and a yielding revolving tension-arm and guide for the cord, provide at all times a means to keep the cord at its proper tension, taking up any slack in the cord, and avoid the liability of breaking the cord, as the friction is adjusted upon the tension-arm to completely obviate any such disaster, as the momentum of the revolution of the arm in taking off the cord in binding is reduced to nearly nothing, as the arm that takes off the cord is so light that the friction regulates the tension and overcomes the momentum of the parts.

$e^9$ is a cord-guide, centrally attached to the front part of frame B, to give direction to the cord in going from the eye in arm $e^5$ to the binding devices. The frame that contains the binding devices is made to have a chamber, F, to receive the cut grain as it is delivered from the reaping part of the harvester, and is located transversely across the binding-machine and about midway of its height, with a tight wall at its front side and open at its ends. F' is a vertically-reciprocating cut-off rack, sliding against the front wall of chamber F, and, when raised at its fullest height, cuts off the flow of the cut grain into binding device. This rack has horizontally-projecting fingers $f$, and a center one, $f'$, that projects beyond or farther from the front than the side ones, for the purpose of parting the cut grain, so that when the rack is raised up no more goes into the binding device during the operation of binding, as this long central finger rises up between the guides D and prevents any more of the grain from advancing until the rack falls down again after the grain that was forced into the binder is bound and discharged. This long central finger $f'$ performs another important function by its being in the center of the length of the straw or weight of the grain, and as it is raised up with the grain upon the fingers between the guides D, completely cuts off all straw that lies in an oblique angle to the finger, and makes a complete separation of the grain-stalks, so that no stray or straggling straw will be connecting two bundles when bound. G is the binding-receptacle, circular in form in cross-section, and composed of the central guide $c^9$ on the forward side, and the curved holder G' on the rear, that is fast to the tilting platform G'' that tilts to discharge the bound bundles from the receptacle. $g$ is a flexible and adjustable binding strap and cord made fast to the curved holder G', and thence to the upright part of guide D behind pulley $g'$ that is secured to guide D; thence upward over pulley $g''$, then horizontally in an angling direction to and over pulley $g^3$ on top of frame B; then down on the side of frame to and around pulley $g^4$; thence horizontally, or nearly so, to a bifurcated pivoted lever, H, to the upper end of which the strap or cord is secured. This binding strap and cord has at G''' a device for adjusting the length of the cord between the binding-receptable and the bifurcated trip-lever H, and by which adjustment the amount of straw in the bundle is determined, and the bundles all bound of uniform length of bands. Lever H is pivoted at $h'$ to a stationary platform, $h''$, by the angular leg $h$, while leg $h^3$ is curved, and has a foot or trip, $h^4$, at its extreme lower end, and, as the top of the lever is vibrated, the foot $h^4$ will rise or fall, according to the direction the top is vibrated. $h^5$ is a spiral spring to hold the top of the lever to pull on cord $g$, and keep the foot down until a greater force is brought to bear upon the binding strap and cord than the spring can resist, when the spring expands and allows the top of the lever to be pulled over and the foot to be raised. I is a horizontal vibrating lever, having one end over the platform $h''$, and under a keeper-plate, $i$, and has at its end two friction-wheels, one, $i'$, to run upon the top of platform $h''$, and the other or outer one, $i''$, to allow the foot $h^4$ of lever H to pass over it easily. $i^3$ is a retaining-spring on lever I, to hold it in position. I' is a horizontal yoke, made fast to lever I at its forward end, with an open space between the sides, and the forward circular end pivoted to arm I'', at $i^4$, while the arm at the other end is pivoted to frame B, at $i^5$. On one side of yoke I' the side piece is made to be a ring, $i^5$, to surround and move a sliding sleeve, $i^6$, on shaft C'. $j$ is an inclined projection on the end of lever I, and projecting into the opening of yoke I'. $j'$ is an arm with an inclined cam on its end, and fast upon shaft C', and revolves with and can be adjusted upon the shaft, and held to any adjustment by the holding-screw $j''$. Upon the end of sliding sleeve $i^6$, next the gear-wheel C, are arms $j^3$, that project at right angles to the sleeve, carrying at the end of one arm a dog, $j^4$, that engages ratchet-teeth $j^7$ on gear-wheel C, which, when so engaged, revolves shaft C' with wheel C, while the dog $j^5$, at the other end of arm $j^3$, engages a slotted arm, $j^6$, that is fast on shaft C', and revolves with it. The arm carrying dog $j^5$, that engages the slotted arm $j^6$, is constructed in this manner for the purpose of reducing the friction developed by revolving the cam on arm $j'$, against the inclined surface $j$ on lever I, while the immediate function of the slotted arm $j^6$ provides a sliding way for the dog $j^5$, so remote from shaft C', that when the arm $j'$, with its inclined cam, strikes the inclined projection $j$ on lever I, it prevents the locking or binding of the parts, and allows an easy lateral movement of the engaging parts, and the dog $j^4$ to be disengaged from the ratchet-teeth. J J are cams fast at each end of the shaft C' and outside of frame B, and only revolve when shaft C' revolves, and are used jointly to raise and lower the cut-off rack F', and for other purposes, to be hereafter explained. These cams are in form of a circle, with a portion on one side removed to near the eye, forming an open space narrower toward the eye than at the rim, as seen in Figs. 2 and 3. J' J' are vertical arms attached at their upper ends to the cut-off rack F', with a brace-arm, J'', extending outwardly from arm J', to receive a shaft, $j^a$, that has friction-wheels $j^8$, to reduce friction where the wheels are in contact with the moving parts of the cam J, and the necessary guides $J^3$. The cams J being in revolution, the side of the opening $j^9$ acts to raise the cut-off rack through the friction-wheels, until the friction-wheels mount the rim of the cam, and travel upon the rim until, in the revolution of the cam, the friction-wheels are at the opposite side $j^x$ of the opening on the cam, when, by the weight of the rack, it and the friction-wheels fall down, until the friction-wheels, in the opening, touch the bottom, and as the rack falls the cams stop their revolution. K and K' are slotted, jointed, and adjustable connecting-rods, attached to the cams J by the wrist-pins $k$ $k$, that work in the slots of the rods, and on one side of the machine one rod is connected to crank $k'$ on rock-shaft L, and on the opposite side to crank $k''$ on rock-shaft L. The cranks $k'$ and $k''$ are placed upon shaft L to project nearly in opposite directions. $k^3$ is a segmental gear on the inside of the cam J, on the left-hand side of the machine, and in the revolution of the cam engages gear-wheel $k^4$ on inclined shaft $k^5$, that revolves in bearings on the side of frame B, near the upper end of shaft $k^5$, and fast thereon is gear-wheel $k^6$, that gears into and revolves gear-wheel $k^7$, that is fast on horizontal shaft $k^8$, that revolves in bearings on the rear side of frame B, extends to near the center of the width of the machine, and has gear-wheel $k^9$ at its center end, gearing into gear-wheel $k^x$, that is fast upon upright knot-tying shaft K'', and revolves it once before the segmental gear $k^3$ is out of gear with the gear-wheel $k^4$. On the top of inclined shaft $k^5$ is a crank or a collar, 1, carrying a concentric segmental bent arm, 2, that, as the shaft $k^5$ revolves, the collar and arm revolve with and make a little more than a revolution. 3 is a fixed dog or stop, fast on the frame B. 4 is a spiral spring, attached to the crank or collar 1 at one end, while the other end is fast to stud 5 on the frame.

As the collar and its bent spring-arm revolve, the arm goes over the end of the stop 3, and as the end passes off the dog, by the excess of one revolution, the end of spring-arm 2 will drop down off the dog, when the spring 4 will act on the collar to bring the end of the spring-arm back to abut against the dog 3, which makes an elastic stop, and prevents any bad effect that might occur if the motion was suddenly and positively stopped at the end of the revolution.

M is a frame for supporting, and contains, the actuating parts of the knot-tying, band-cutting, and band-discharging devices, and is suspended and held in its position on frame B by the brace-rods $m$ $m$ $m$ $m$. $m'$ is a concentrically-slotted plate, centrally through which passes the knot-tying shaft K'', and is made fast to the upper part of the frame M by holding-screws $m''$, and to the frame B by the braces $m^3$. $m^4$ $m^4$ are concentric slots in plate $m'$. N is a sliding sleeve, with arms $n$ $n$ on opposite sides, and is loosely fitted on the knot-tying shaft K'' underneath plate $m'$. N' is a fixed collar, with arms $n'$ on opposite sides of its center, slotted at their ends to receive the lower ends of arms $n$ $n$. $n''$ is a spiral spring around shaft K'', beneath the sleeve, above the collar N', and between the arms $n$ $n$. On the upper end of sleeve N is an upwardly-projecting inclined cam, $n'''$, that, in the revolution of the sleeve, strikes against an inclined cam, $m^5$, on the under side of plate $m'$, which forces the sleeve N and its arms $n$ down. The lower half of the knot-tying shaft K'' is centrally bored to receive the shaft of cord-hook $n^4$, that extends upward in the shaft K'' far enough to have two grasping-jaws, $n^4$, that are fast to the sliding sleeve, and on opposite sides thereof, to take hold of the upper end of the spindle or shaft of the cord-hook $n^4$, and securely hold it in their grasp. The sides of the bored part of the shaft K'' are slotted to allow the grasping part of the jaws to slide freely therein. The knot-tying shaft K'' has, at its lower end, a cord-hook, $z$, projecting from one side and upward to receive and hold thereon the cord, so that, as the hook is revolved in tying the knot, the cord passes under the hook and forms the loop of the knot. In the lower curved surface of hook $z$ is a radial groove, $z'$, extending from the bore for the spindle that is in the center of the shaft $K''$ outward to near its terminal point. This groove is to receive the hook on spindle $n^4$, with the cord between the two hooks, and so that the loop in the cord will pass over the hook on spindle $n^4$, in forming the knot, as the shaft K is revolved. Shaft $K''$ is cut away on the hook side, from just above the hook, about half its diameter, and high enough to allow the cord-carrier to freely pass by in compressing the bundle and carrying the cord over the cord-hook.

This construction is for the purpose as follows: The spring $n'$ holds the hook of spindle $n^4$ up, with the cord above it, against the under side of the hook of the knot-tying shaft, to prevent any slipping of the cord during the operation of tying the knot, and, when the knot is made, to still hold its gripe on the cord until the cord is forced out from between the two hooks, and the knot drawn tight and hard. The hooks are separated by the cam on the upper side of sleeve N striking against the cam $m^5$ on the under side of plate $m'$, forcing the spindle of the cord-hook down.

L is a horizontal transverse rock-shaft, rocking in bearings fast to the frame B, and is caused to be turned or rocked back and forth by the connecting-rods K and $K'$ and cranks $k''$, one of which cranks forces it to rock in one direction, and then the other to return it to its original position. Centrally of the length of shaft L, and fast thereto, is secured the bent cord-carrier and bundle-compressor $L'$, held in place by holding-screw $l$, and rocks or vibrates with the rock-shaft L, on the outer curved edge of which is a groove, in which lies and is carried the cord to a slit on one side of the groove, to let the cord pass to one side of the carrier; thence the cord passes laterally through an eye, $l'$, in the end of the carrier. O is a device for receiving and holding the cord fast on frame M, and is composed of two blocks, $o$ and $o'$. Block $o$ has journaled in it a shaft, on which is a projecting grooved elastic-faced wheel, $o''$; and block $o'$ has also a shaft, carrying another projecting wheel, $o^3$, having a tooth-disk to fit into the groove in wheel $o''$, and between which wheels the cord for binding is placed by the carrier $L'$, and carried to the proper position by the teeth on wheel $o^3$ by a partial revolution of wheel $o^3$, and there held until another advance to revolve the wheel is made. The wheels $o''$ and $o^3$ are pressed together, so that the grooved flexible wheel will envelope, for a considerable distance, the periphery of the toothed wheel, which will hold the cord and prevent its slipping. On the same shaft with wheel $o^3$ is a ratchet-wheel, $o^4$, having the proper teeth to revolve wheel $o^3$; and also on the same shaft, and loosely fitted thereon, is a tilting device, $O'$, carrying a pivoted pawl, $o^6$, on the side next the ratchet-wheel, to engage with the teeth of the ratchet-wheel when the device is tilted in one direction, and at the opposite side of the tilting device from the pawl is a foot, $o^7$, upon which the end of the cord-carrier strikes and forces it down, and as it is so tilted the pawl engages a tooth on wheel $o^4$ and revolves wheel $o^3$ a partial revolution, and as the cord-carrier is lifted from the foot $o^7$ the opposite side of the tilting device is balanced to bear it down to rest upon the gage-screw $o^8$, so that the pawl will be out of contact with the teeth on ratchet-wheel $o^4$, and ready for another advance movement. P is a bent cord-latch, pivoted at $p$ to the frame B, then rising upward, and bending inward and downward to the center of the width of the machine, and just forward of the knot-tying shaft to the latch or point $p''$, where it comes in contact with the cord, then bends horizontally, then upward a short distance, and then curved around nearly horizontally to the opposite side of the tying-shaft from its pivoted end to where it suddenly bends downward, then horizontally in a direction toward the tying-shaft, where it is connected to pivoted guide-arm $p''$, and then it connects to a circular carrier, $p^3$, of less diameter, and within the curvature of the latch-arm, which has an inclined arm, $p^4$, extending a distance below the curved horizontal portion. $P'$ is a spiral spring, attached at its lower end to the latch-arm P near to where it connects with the guide-arm $p''$, and at its upper end to the top of frame M, or other convenient solid part. This spring is for the purpose of returning the arm of latch P to its proper position after a knot is tied. Q is a bent projecting arm from an eye, $q$, around the knot-tying shaft $K''$, and revolves with it, and as it revolves strikes against the inclined arm $p^4$ of latch-arm P and forces the latch down upon the cord at the proper time. When the arm Q has forced the latch down it holds it there until it passes off of the return circular carrier $p^3$, when the latch will rise by the power in spring $P'$ to its original position. This latch, when thus held upon the cord, prevents any derangement of the cord while the loop is being formed and the knot tied. R is a rock-shaft, working in bearings $r\ r$ that are fast to top of frame M. $R'$ is a bent arm, attached to the rock-shaft, and bending downward below the path of the revolution of arm Q, while another bent arm, $R''$, passes on the opposite side of the rock-shaft downward, and curves toward, underneath, and past the knot-tying shaft $K''$. On arm $R''$, near its terminal end, is an upwardly-projecting knife, $r'$, to cut the cord, while farther back from the end than the knife is a curved and upwardly-projecting arm, $r^3$, to force the cord off the knot-tying hook after the cord is cut by knife $r'$. $r^4$ is a spiral spring fast at one end to the bent knife-arm $R''$, and the other end fixed to the frame B. This device for cutting and removing the cord is operated by the revolution of the arm Q on shaft $K''$, and striking against the lower part of arm $R'$, and carries it forward, rocking the shaft, and forcing the arm $R''$ on the opposite side of the rock-shaft that carries the knife and bent arm, to advance toward the knot-shaft, the knife passing on one side of the shaft and severing the cord between the shaft and cord-holding wheels, and passing forward until the bent arm passes on the other side of the shaft, and forces the cord off the hook, and as this is accomplished the arm Q has lost its hold of arm R' when the spiral spring $r^4$ acts to pull the knife and bent arm on arm R'' back to their former position. S and S' are shields for the knot-tier to prevent any substance from interfering with the operation of tying the knot. S is attached to the bottom of frame M, and is directly underneath the knot-tying shaft K'', curves slightly upward for a distance from frame M, and then is horizontal, or nearly so, to its end. S' is attached to the upright part of guide-plates D a trifle higher than shield S, and to one side of it, but having their approximate sides vertical to each other, which will allow the cord to pass between them, but prevent straw from clogging the small horizontal space between them. Above these shields, and below the knot-tying hooks, is a free open space for discharging the pieces of cord that may be left after tying and cutting, or other litter that may accumulate thereon. G'' is a tilting platform in horizontal position, and supported by upright arms $s$, rigidly secured at each end, which arms are pivoted at $s''$ to horizontal arms $s'$ that are rigidly attached to the frame B. S'' S'' are latch-arms, one at each end of the platform G'', and when holding the platform are in a horizontal position, and have a catch, $s^3$, at their terminal ends to take hold of a projecting stud, $s^4$, on the frame B, and keep the platform in position when latched. These latch-arms are fixed to eyes $s^5$ that surround fixed shafts $s^6$, so that the eyes can rock on their shafts and unlatch the platform from the frame and allow it to tilt. $s^7 s^7$ are guides over latch-arms. T T are upright and bent levers fixed to eyes $s^5$ on their top sides. $t\ t$ are braces from the straight part of levers T to near the outer ends of the latch-arms S'', to strengthen the levers in operating to throw the latches out of their hold with the studs $s^4$, and release the platform, so as to tilt. $t'\ t'$ are spiral springs, their upper ends fast to the bent levers T, and their lower ends secured to the outer edge of the platform, for the purpose of returning the latch-arms to their proper position after they have been forced out of their hold on studs $s^4$. U U are bundle-discharging hooks, fixed at their lower ends upon the top of platform G'', are bent and inclined toward each other at their upper or hook ends, and, when the platform G'' is tilted or swung away from the frame, will surely discharge the bound bundle of grain from the binding-receptacle. V V are bent spring-arms, with catches $v$ near their outer ends, and inclined from the extreme points to the catch, to be thicker at the catch, and are fast upon rock-shaft L, and vibrate with it.

As the rock-shaft is partly rotated by the connecting-rod that is attached to cranks $k'$, and, as the rock-shaft is so rotated, the spring-arms V are carried upward to engage their catches on the levers T, where they remain until the cranks $k''$ act to pull the spring-arms that have hold of levers T back, when the latch-arms are disengaged from their holding-studs, and the platform is tilted over and kept tilted until the catches on arms T pass off at the ends above the bent part.

To deliver the grain from the reaper into the binder in a proper manner, the center of the length of the straw of the grain must be directly in line with the tying device; and, as standing grain is not always the same height or length of straw, it is necessary to provide for the adjustment of the binder to have the right position with relation to the delivery of the grain into the binder. To successfully do this the binder with its frame is constructed to be instantly and easily adjusted upon the frame of the reaper by the following construction: Upon cross-ties A'' are guide-plates $a\ a$, held by screws, with grooves in their inner edges, and on the under sides of the transverse sills of frame B are fixed projecting plates $a'\ a'$, that fit and slide in the grooves of guide-plates $a$. This construction allows of a horizontal transverse movement of the frame of the binder upon the sills of the reaper. Directly under and fast to the center sill of the binder-frame is a rack, $a''$, projecting beyond the frame on one side, as seen in Fig. 1, and having a supporting-brace, $a^3$, to support the projecting end. $a^4$ is a toothed pinion, that gears into rack $a''$, and is fast upon horizontal shaft $a^5$, that is secured and turns in bearings that are fast to the reaper-sills. $a^6$ is a toothed or indent wheel on the shaft $a^5$. $a^7$ is a lever, turning on shaft $a^5$, with a spring-catch attached, that can be quickly raised out of the indents in wheel $a^6$, and the lever turned to have the catch take into another indent, and, by swinging the lever, shaft $a^5$ and toothwheel $a^4$ will be partially rotated, which reciprocates the rack $a''$, and the frame B will move with the rack whichever way it reciprocates.

This construction affords an easy and sure way of adjusting the binding devices to be in the exact position relatively with line of delivery of the unbound grain from the reaper into the feeding and binding device; and as the hand-lever $a^7$ is in easy reach, and the operative parts of the feeding, binding, and discharging devices are in view of the driver, the binder-frame B can be adjusted while the machine is in full operation, as the height of the grain may and does change at different parts of the same swath, or on different sides of the same field, and requires a change in the position of the binder-frame; consequently the cord is placed around the grain, and the bundle is bound in the right place, or at the center of the length of the straw of the cut grain.

The operation is as follows: The binding-cord being in place, by passing it from the spool through the guides, over the cord-carrier, and through its eye, over and beyond the hook of the knot-tier to the cord-holder, and there securely held, the binder adjusted properly upon the frame of the harvester to deliver the grain centrally with the line of the knot-tying device, the machine is put in motion by the forward movement of the harvester. The cut grain flows into the receptacle of the binder, and is fed toward the bundle-receptacle by the movement of the feed-dogs, and against the curved holder, binding-cord, and adjustable binding-strap, which, when the unbound grain is pressed against the strap sufficiently, causes the trip-lever to which it is attached to move and allow the other parts of the device to operate. As the movement of other parts is now affected, a vertically-working rack in the receptacle is raised, which holds back the inflowing grain, while that which has passed off the rack is advanced by the feed-dogs, to make a clear open space behind it, so that the cord-carrier can grasp it and compress it in the binding-receptacle while the knot is tied on the cord that surrounds it. By the first movement of the trip-lever through its connection the cam-shaft, with its cams, are put in revolution, which causes the cut-off rack to rise, and in their continued revolution hold the rack in its raised position until the bundle is bound, the cord cut, and the bundle discharged, and the rack is caused to fall by its own weight by the termination of its support on the periphery of the cams. The feed-dogs force the grain from the point where the long central finger of the rack parted the grain forward of and beyond the end of the cord-carrier opening, a space through which the cord-carrier and cord safely pass without obstruction by the straw, and the movement of the cord-carrier continuing the cord is carried and placed in the knot-tier, thence onto the teeth of the projecting disk-wheel, and carried by the partial rotation of that wheel into the groove of the elastic faced wheel and held fast, while the cord-carrier and compressor moves still further forward in order to furnish a slack cord while the loop is being formed by the rotation of the knot-tier, to prevent the breaking of the cord in tying the knot. When the cord-carrier and compressor has reached its ultimate forward movement the grain is held between it and the curved holder G'. At the time the cord is being grasped and forced between the wheels of the cord-holder the segmental gear upon the cam-wheel engages with the pinion of the shaft that rotates the knot-tier. At the time that the cord-carrier and compressor moves to produce the slack the knot-tier turns to take up the slack in forming the loop and tying the knot. In continuing the rotation of the knot-tier, the bent arm attached thereto strikes against the inclined portion of the cord-latch (the cord having previously passed by and under the latch) and forces it down, and securely holds it in the knot-tier while the loop is being formed. At the time the loop is being formed around the upward-projecting part of the knot-tier the cam-arm attached to the sleeve meets and is pressed down by the cam. This carries with it the grasping-hook, which opens at the proper time and passes under the cords between the knot-tier and cord-holder. This being done the sleeve-arm passes beyond the cam, and being free to rise is pressed upward with the full force of the spring, so that the cords are held between the cord-grasping hook and the knot-tier hook in such a manner that the knot will be firmly drawn up, yet the ends will be allowed to yield and pass out from between the cord-hook and the knot-tier hook before the cord can be broken. At the proper time the bent arm attached to the knot-tier also reaches the arm of the rock-shaft carrying the knife and hook, and the knife is moved rapidly forward and severs the cord near the cord-holding wheels. Then the hook or bent arm strikes against the cords between the bundle and knot-tier, and moving rapidly forward forces the loop over the ends of the cord that is held between the knot-tier and grasping-hook, and does not stop until the severed ends of the cords are forced from between the cord-grasping hook and knot-tier, and the bundle is left perfectly bound and free to be discharged. The continued rotation of the cam-wheels have now carried the wrist-pin on right-hand side to the extremity of the slot of the connecting-bar, which causes the rock-shaft of the cord-carrier and compressor to be moved back to its original position, and as the spring-latches that are attached to the rock-shaft and move with the cord-carrier, and take hold of the lock-levers at a point above where the holding platform is hinged it is unlocked and rapidly tilted the discharging-hooks attached thereto force the bundle from the receptacle. The spring-latches now pass beyond the end of the lock-levers and the platform returns back again and is securely locked to the frame for the next bundle. It will also be seen that the binding-cord will be held the same as at the commencement of the operation and ready for the next bundle. The continued rotation of the cam-wheels, and consequently the cam-shaft, will have arrived at the point where the cam upon the cam-arm of the cam-wheel shaft will engage with the cam upon the yoke of lever. This will cause the end of the lever to move under the horizontal portion of the bifurcated trip-lever, and it will continue so to move by the power of the driving mechanism until the dog is disengaged from the ratchet-teeth upon the side of the gear-wheel, when the power of the driving mechanism to carry it farther will cease. At this time the friction-wheels that suspend the lifting cut-off rack will have arrived at the inclined portion of the cam-wheels, and as the rack, and consequently the friction-wheels that support it, fall vertically upon the inclined part of the cam, the cam-wheels, and consequently all the parts attached thereto, are forced still farther around, until the entire revolution is made. This causes the lever to move so far that the concentric part of the bifurcated trip-lever slips over the roller upon the end of trip-lever; and, by the power of the spring attached to the trip-lever, it is drawn down over the roller until arrested by the adjusting-strap, when the binding mechanism will be entirely disengaged and held from the power that drives it, as at the commencement of the operation.

Having thus described my invention, what I claim, and wish to obtain Letters Patent for, is—

1. The hand-lever $a^7$, toothed wheel $a^6$, shaft $a^5$, gear-wheel $a^4$, and rack $a''$, in combination with the frame B of a grain-binder, constructed substantially as and for the purpose described.

2. The revolving crank-shaft $C^3$, having cranks $c\ c$, in combination with the segments $C^4$, having the feed-teeth $c^6$ and their intermediate operating parts, substantially as described.

3. The reciprocating segments $C^4$, having the feed-teeth $c^6$, in combination with the guides D, as and for the purposes specified.

4. The curved guides $c^8$ on either side of the feeding-teeth $c^6$, and parallel with their motion, in combination with the center guide, $c^9$, reciprocating segment $C^4$, feed-teeth $c^6$, and binding-receptacle G, as and for the purpose specified.

5. The revolving tension and take-up arm $e^5$, having eye $e^6$, through which the binding-cord passes, in combination with a non-revolving cord-spool, $e''$, that contains the binding-cord, constructed substantially as and for the purposes described.

6. The combination of the cord-spool $e''$, revolving arm $e^5$, having eye $e^6$, and guide-arm $e^8$ with the curved and grooved cord carrier L$'$, substantially as and for the purpose described.

7. The curved and slit cord-carrier L$'$, and grooved on its outer edge, having eye $l'$ transversely through the outer end, where the cord is delivered onto the knot-tying hook and cord-holding device O, substantially as and for the purposes described.

8. The cord-carrier and bundle-compressor L$'$, in combination with the curved holder G$'$ and cord-holding device O, constructed and arranged to produce sufficient slack in the cord for tying the knot, substantially as described.

9. The shields S attached to frame M, and S$'$ to guide D, constructed and arranged with relation to each other and the knot-tying device, and for the purpose described.

10. The flexible strap $g$, arranged in receptacle G to operate trip-lever H, in the manner substantially as and for the purposes described.

11. The combination of the binding strap and cord $g$ with the bundle-receptacle G and tooth-feeding segments $C^4$, substantially as and for the purposes described.

12. The combination of the trip-lever H, horizontal lever I, shaft $C'$, and gear-wheel C and their intermediate devices, constructed substantially as and for the purpose described.

13. The combination of the cam $j$ on lever I, cam on arm $j'$, sliding sleeve $i^6$ with arms $j^3$, dogs $j^4$ and $j^5$, and slotted arm $j^6$ with the ratchet-teeth $j^7$ on wheel C, substantially as described.

14. The arms $j^3$, with dogs $j^4$ and $j^5$, in combination with the slotted arm $j^6$, to form a clutch-connection with the ratchet-teeth on wheel C, substantially as described.

15. The revolving cams J J, in combination with the vertically-reciprocating rack F$'$ and their intermediate operating devices, substantially as and for the purpose described.

16. The vertically-reciprocating rack F$'$, having the horizontally-projecting fingers $f$ and center long finger $f'$, in combination with the guides D, substantially as described.

17. The combination of the cam J, slotted connecting-rod K, crank $k'$, rock-shaft L with the cord-carrier and bundle-compressor L$'$, substantially as described.

18. The combination of the cams J J, slotted connecting-rods K and K$'$, cranks $k'$ and $k''$, bent spring-arms V V with vertical levers T, latch-arms S$''$, and tilting platform G$''$, substantially as and for the purposes described.

19. The combination of the segmental gear-teeth $k^3$ on cam J, train of gear, and their shafts $k^4$, $k^5$, $k^6$, $k^7$, $k^8$, $k^9$, and $k^\times$ with the knot-tying shaft K$''$, substantially as described.

20. The combination of shafts $k^5\ k^8$ and knot-tying shaft K$''$, and their driving-gears, with crank 1, spring-arm 2, and stop 3, as and for the purpose described.

21. The combination of the sliding sleeve N, having pendent arms $n\ n$ sliding in slotted arm $n'$, grasping-jaws $n^5$, and spring $n''$, and actuating devices, with the reciprocating cord-hook spindle $n^4$, that slides in the knot-tying shaft K$''$, as described.

22. The yielding and bent cord latch-arm P with latch $p''$, and bent in the form substantially as and for the purposes described.

23. The combination of the arm Q on shaft K$''$ with the arm $p^4$ on latch-arm P, substantially as and for the purpose described.

24. The combination of the arm Q on shaft K$''$ with arm R$'$ and bent arm R$''$ on rock-shaft R, and carrying the cord-cutting knife $r'$, substantially as described.

25. The combination of arm Q on shaft K$''$ with arm R$'$ and bent arm R$''$ on rock-shaft R, and carrying the projecting cord-arm $r'''$, to force the cord from the knot-tying device, substantially as described.

26. The combination of arm Q on shaft K$''$ with arm R$'$ and bent arm R$''$ on rock-shaft R, carrying the knife $r'$ for cutting the cord, and arm $r'''$ for forcing the cord off the hook, substantially as described.

27. The combination, with the tilting platform G'', of the discharging-hooks U U, as and for the purpose described.

28. The combination of the grooved elastic-faced wheel $o''$ on fixed axle with the toothed disk-wheel $o^3$, between which the binding-cord is held, substantially as described.

29. The combination of the cord-carrier and bundle-compressor L' with the tilting device O', having pivoted pawl $o^6$, foot $o^7$, ratchet-wheel $o^4$, and cord-carrying wheel $o^3$, substantially as and for the purpose described.

30. The upwardly-projecting hook $z$, having groove $z'$ therein, in combination with the cord-hook on spindle $n^4$, substantially as and for the purpose described.

31. The combination of the falling rack F' with the inclined recesses in cam J, for the purpose of continuing the rotation of shaft to replace the lever I in position with lever H to make a succeeding operation, substantially as described.

32. The vertically-rising holding-rack F' and its dividing-finger $f'$, so arranged, with relation to the feed-dogs $c^6$, as to part the unbound grain and make an open space, through which the cord-carrier L' passes, substantially as and for the purpose described.

MARQUIS L. GORHAM.

Witnesses:
C. T. FRITZ,
J. MASON GOTZLER.